C. E. FAULKS.
SAFETY PIN.
APPLICATION FILED AUG. 21, 1913.
1,141,952.
Patented June 8, 1915.
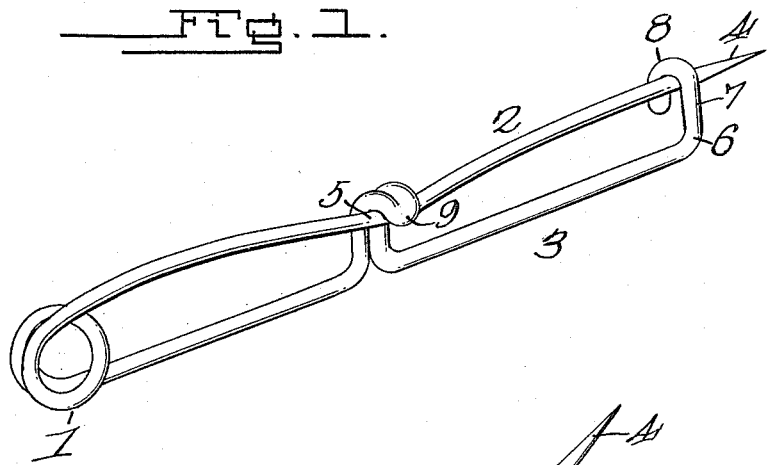
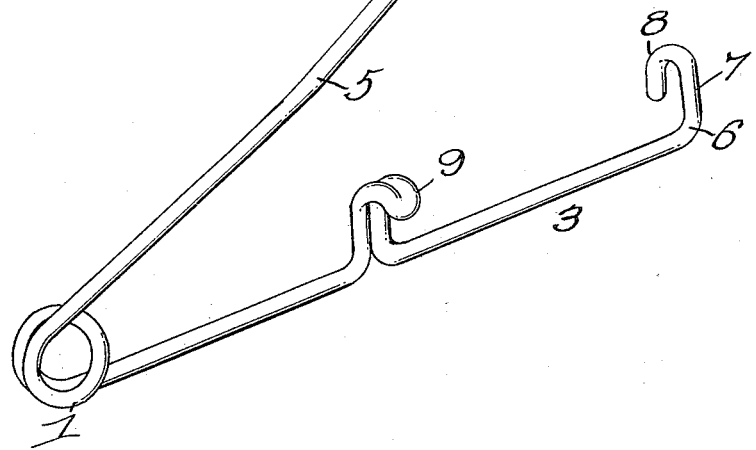
Witnesses
A. P. Marston
C. A. Crawford
Inventor
Chelcias E. Faulks,
By Richard Dewey,
his Attorney

UNITED STATES PATENT OFFICE.

CHELCIAS E. FAULKS, OF PUEBLO, COLORADO.

SAFETY-PIN.

1,141,952.  Specification of Letters Patent.  Patented June 8, 1915.

Application filed August 21, 1913. Serial No. 785,987.

*To all whom it may concern:*

Be it known that I, CHELCIAS E. FAULKS, a citizen of the United States, residing at Pueblo, in the county of Pueblo and State of Colorado, have invented certain new and useful Improvements in Safety-Pins, of which the following is a specification.

This invention relates to improvements in safety pins and is especially adapted for use in connection with extra long safety pins to prevent the center of the pin portion from being buckled or "humped" outwardly under the strain imposed thereon between the coil and the pin hook.

One of the features of the invention consists in providing a hook for engaging an intermediate or central part of the pin portion between the coil and the pin hook, and this feature of the invention includes the novel construction whereby the entire pin may be formed of a single piece of wire.

A further feature consists in bending or "humping" the pin portion centrally thereof toward the back portion to counteract any tendency on the part of the pin portion to spread outwardly from the back portion.

A further function resulting from the bend or "hump" in the pin portion is to cause the same to engage the intermediate hook and retain itself in position even though the outer end of the pin portion is removed from the end hook so that if two grips or holds of goods are pinned, the outermost one may be released without releasing the pin from the intermediate hook.

A further novel feature is to dispose the end and intermediate hooks of the back portion oppositely to each other so that one will coöperate with the other in retaining the pin in hooked engagement.

Other novel features will be more fully described in connection with the accompany drawing and will be more particularly pointed out and ascertained in and by the appended claims.

In the drawing:—Figure 1 is a view in perspective of a safety pin embodying one form of my invention, with the pin portion in closed or hooked engagement with the back portion. Fig. 2 is a perspective view showing the pin portion unhooked.

Like characters of reference designate similar parts with the different figures of the drawing.

As illustrated, the safety pin is formed of a single length of wire which is substantially centrally bent in the form of a coil 1, to impart the necessary resiliency, the coil 1 dividing the wire into a pin portion 2, and a back portion 3. The pin portion 2 is provided with the usual pointed end 4, and is preferably centrally bent toward the back portion 3, at 5, so as to prevent the strain or load on the pin portion from buckling or "humping" the same outwardly from the back portion 3, and also to prevent the end of the pin from being drawn inwardly out of the end hook. The back portion 3 is bent at 6 to give the pin the desired depth by a length 7, and retaining means such as a hook 8 is formed for engagement with the pointed end of the pin portion, which hook may be termed the terminal or end hook. As a further means of preventing outward bending of the pin portion 2, I bend the back portion 3 into an intermediate hook 9 adapted to engage the bend 5 of the pin portion 2. Thus when the pin portion is in engagement with the back portion it will be held thereby in said hooks at at least two points along its length. As a still further means of insuring hooked engagement of the pin portion, I dispose the hooks 8 and 9 in opposite directions, as is clearly shown. This arrangement will permit of the removal of the pointed end without causing removal of the pin portion from hook 9.

The coil will be constructed to impart sufficient tension so that when the pin portion is shifted on to the intermediate hook, the tension of the outer end of the pin portion will be such as to cause the same to spring into the terminal hook when shifted thereover. This function is, in the present construction, more effectively performed where the pin portion is bent or "humped" near the point of its engagement with the central hook. I may also dispose the intermediate hook at a slightly less distance from the back portion, than the terminal hook, and thereby increase the tension grip of the pin end with the terminal hook. From the foregoing it will be readily understood how successive holds of material can be pierced by the pin portion and retained when the pin portion is successively engaged with the intermediate and end retaining means and thereby also preventing the outer end of the pin from ever working loose from the terminal hook or retaining means because of the support afforded by the intermediate hook.

In the present construction, the hook 9 is nearer to the back than the hook 8, and the outward bend of the pin causes the pointed end to assume a position outwardly from the hook 8, when the humped portion 5 is engaged in the hook 9, so as to require a relatively considerable pressure on the end 4 to shift the same into engagement with the hook 8. It will be clear that my improved pin will function in this manner irrespective of whether the hooks are oppositely disposed, the one feature being preferably combined with the other to render the structure more efficient.

It will thus be seen that out of a single length of wire I am able to construct an entire pin, and it is believed that the utility and advantages of the invention will now be clearly understood, and while I have herein shown one specific form of my invention, I do not wish to be limited thereto, except for such limitations as the claims may import.

I claim:—

1. A safety pin having pin and back portions, said back portion provided with a relatively long pin-retaining portion formed at the end thereof and further provided with an intermediate pin-retaining portion of reduced length with respect to said first-named retaining portion, and said pin portion bowed in its central extent to follow substantially the variation of disposition of the retaining portions and to be sprung into each.

2. A safety pin having pin and back portions, said back portion having a relatively long pin-retaining portion opening for insertion and removal of the pin from one side of the device and also having an intermediate pin retaining portion of reduced length with respect to said first retaining portion and opening for insertion and removal of the pin on that side opposite to the opening of said first retaining portion, and said pin portion bowed in its body extent to follow substantially the variation of disposition of the retaining portions and to be sprung into place within the confines of the intermediate retaining portions and subsequently to a confined position within the end-retaining portion.

In testimony whereof I affix my signature in presence of two witnesses.

CHELCIAS E. FAULKS.

Witnesses:
CHARLES H. COLE,
IDA MANUEL.

Copies of this patent may be obtained for five cents each, by addressing the "Commissioner of Patents, Washington, D. C."